United States Patent [19]
Girard

[11] Patent Number: 5,790,347
[45] Date of Patent: Aug. 4, 1998

[54] HEAD SUSPENSION LOAD BEAM AND FLEXURE CONSTRUCTION FOR REDUCING STRUCTURAL HEIGHT

[75] Inventor: Mark T. Girard, Hutchinson, Minn.

[73] Assignee: Hutchinson Technology Incorporated, Hutchinson, Minn.

[21] Appl. No.: 772,353

[22] Filed: Dec. 23, 1996

[51] Int. Cl.$^6$ .................................................. G11B 5/60
[52] U.S. Cl. ..................................................... 360/104
[58] Field of Search ..................................... 360/103–106

[56] References Cited

U.S. PATENT DOCUMENTS

| | | | |
|---|---|---|---|
| 5,331,489 | 7/1994 | Johnson et al. | 360/104 |
| 5,377,064 | 12/1994 | Yaginuma et al. | 360/104 |
| 5,428,490 | 6/1995 | Hagen | 360/104 |
| 5,434,731 | 7/1995 | Hagen | 360/104 |
| 5,504,640 | 4/1996 | Hagen | 360/104 |
| 5,568,332 | 10/1996 | Khan | 360/104 |
| 5,608,590 | 3/1997 | Ziegler et al. | 360/104 |
| 5,612,841 | 3/1997 | Johnson | 360/104 |
| 5,617,274 | 4/1997 | Ruiz | 360/104 |
| 5,636,089 | 6/1997 | Jurgenson et al. | 360/104 |
| 5,638,234 | 6/1997 | Hagen | 360/104 |
| 5,659,448 | 8/1997 | Shimizu et al. | 3610/104 |

FOREIGN PATENT DOCUMENTS

0 597 708  5/1994  European Pat. Off. .

Primary Examiner—Jefferson Evans
Attorney, Agent, or Firm—Faegre & Benson LLP

[57] ABSTRACT

A head suspension includes a two piece construction including a load beam and a separately formed flexure wherein the assembly and construction facilitates the need for less space between disks within a disk drive. More specifically, the thickness of the flexure member need not be factored into the height of the load point dimple. The load point dimple height need only facilitate pitch and roll slider movements; thus, reducing the side profile of the head suspension. Moreover, the present invention allows for the use of load point dimples which are formed within the thickness of the load beam material, which can further reduce the side profile. In one aspect, a mounting surface of the mounting portion is provided on an opposite side of the load beam than the side of the load beam from which the load point dimple extend. The load portion can be also provided with a reduced thickness area with the load point dimple within the reduced thickness area. Alternatively, with the provision of a reduced thickness area the mounting surface of the mounting portion can be provided on the dimple side of the load beam with each of its spring arms including an offset bend for providing a first surface portion of each spring arm that is spaced closer to a level of a surface of the reduced thickness area.

25 Claims, 5 Drawing Sheets

HEAD SUSPENSION LOAD BEAM AND FLEXURE CONSTRUCTION FOR REDUCING STRUCTURAL HEIGHT

TECHNICAL FIELD

The present invention is directed to a head suspension for supporting a head slider relative to a rigid disk, the head suspension of the type constructed from a separately made load beam and flexure. More particularly, the flexure and load beam are assembled and made to reduce the thickness of the head suspension in side profile.

BACKGROUND OF THE INVENTION

Within the data storage industry, data storage devices typically include a head for reading and/or writing data onto a storage medium. Storage device examples include magnetic and optical devices. The storage medium may be in the form of a disk which may be flexible or rigid depending on the disk drive. An actuator mechanism is used for positioning the read/write head at specific locations or tracks in accordance with the disk drive usage. Linear and rotary actuators are known based on the manner of movement of the head. Head suspensions are provided between the actuator and the head and support a slider in proper orientation relative to the disk surface.

In a hard drive incorporating one or more rigid disks, head suspensions are provided for supporting a head to "fly" over the surface of the rigid disk when it is spinning. Specifically, the head is usually located on an aerodynamically designed slider which flies on an air bearing generated by the spinning disk. In order to establish the flying height, the head suspension is also provided with a spring force that counteracts the aerodynamic lift force generated by the action of the slider and the air bearing.

A suspension assembly of the type used in a rigid disk drive comprises the slider and the head suspension, the head suspension comprising a load beam and a flexure. Load beams normally have an actuator mounting region, a rigid region and a spring region between the actuator mounting region and the rigid region for providing the aforementioned spring force. A bend in the form of a radius within the spring region can be used to provide the spring force. The flexure is provided at the distal end of the load beam from the actuator mounting region and provides a slider mounting pad to which the slider is mounted and which is designed to permit pitch and roll movements of the slider to follow disk surface fluctuations. Many types of flexures have been developed including flexures that are integrated into the design of the load beam and those formed as a separate element and fixed to the rigid region of the load beam. The present invention is directed to the type of head suspension including a separate flexure element that is fixed to the load beam.

In order to permit pitch and roll movements of the slider, flexures typically include a cantilever portion having a free end which is resiliently movable relative to the remainder of the flexure. Depending on the design, more than one movable end may be provided. In the case of a separately formed flexure, the flexure typically includes a mounting portion for connection with the rigid region of the load beam and a cantilever portion extending from beyond the tip of the load beam back toward the actuator mounting region. The cantilever portion is connected with the mounting portion of the flexure by one or more spring arms. The rigid region of the load beam includes a load portion that extends over and interacts with the cantilever portion of the flexure to provide a point load, such as by way of a dimple, about which pitch and roll movements can occur. Such a load point dimple may be provided extending from either an engagement side of the load portion of the load beam or an engagement side of the cantilever portion of the flexure. The cantilever portion of the flexure includes the slider bond pad surface to which the slider is mounted, and the oppositely facing engagement surface of the cantilever portion contacts the engagement side of the load portion (usually by way of a load point dimple).

Developments are being made for increasing the storage capacity of hard drives and in the reduction of the size of the hard drives to facilitate smaller and more powerful computers. In a rigid disk drive, the rigid disks are typically provided in a stack on a spindle. Likewise, the read/write heads are supported by a stack of head suspensions, each of which is connected with the actuator assembly for moving the stack of head suspensions over the respective surfaces of the rigid disks. The actuator may be linear or rotary as defined by the movement of the heads. By decreasing the spacing between the disks within such a stack, greater storage capacities can be achieved. Moreover, even with smaller disks and smaller size restrictions, with increased storage densities of the disks, much greater capacities can be achieved in even smaller spaces. Greater storage density of the disks require that the heads fly closer to the disk surface during use.

The spacing of the rigid disks, however, and more importantly the space between the disks, is limited by the ability to insert and position the suspension assembly or assemblies within the space. Thus, to enable closer disk spacings, it may be desirable to reduce the thickness of the suspension assemblies including the thickness of the head suspension and the thickness of the slider. It is important, however, when attempting to reduce thickness to maintain performance characteristics of the head suspension. Simply making the head suspensions, for example, from a thinner material can have a deleterious effect on performance. Head suspensions are designed to have stiffness characteristics in its bending modes, torsional modes, and lateral bending modes. Performance must be particularly controlled at the resonance frequencies of the specific modes. Thus, to use thinner materials, other design features may need to be incorporated such as using higher side rails or other stiffening features to enhance stiffness to control any of the various modes.

With a two piece head suspension construction, the thickness of the side profile of a suspension assembly at the slider supporting tip includes the thickness of the slider, the thickness of the slider bond pad of the flexure, the height of the load point dimple, the thickness of the load beam and the height that any rails or tabs might extend above the opposite surface of the load beam. As above, the predetermined spring force or load for establishing flying height is imparted to the slider by the bend of the spring region of the head suspension. That load is provided for a specific offset height. Offset height is a measure of the difference between the level of the slider bond pad and the level of the actuator mounting region when the slider is at its designed flying height. Typically, offset heights range from 0.1 mm to 0.7 mm. Thus, the spacing between rigid disks requires the accommodation of the thickness of the head suspension assembly, its offset height, and the flying height of the slider over the disk surface. In a typical hard drive, a pair of suspension assemblies are provided between a pair of disk surfaces, one to read or write to the lower surface of an upper disk and the other to read or write to an upper surface of the lower disk.

Included within the sum of elements defining the thickness of the suspension assembly, the load point dimple has height requirements. In a two piece head suspension construction, the flexure is mounted to the load beam on the same side as the engagement side of the load portion. The flexure includes a flexure tongue having an engagement surface that contacts the engagement side of the loading portion by way of the load point dimple (which may extend from either engagement surface). The flexure tongue is normally formed out of the plane of the mounting portion of the flexure by providing offsets within the spring arms of the flexure. The height of the load point dimple must be sufficient so that the flexure tongue can move with the slider in the pitch and roll directions of the slider to accommodate disk surface fluctuations. In other words, the load point dimple must be high enough so that the slider can pitch and roll adequately without contacting the load portion of the load beam or the flexure. The height of the load point dimple also maintains a prestress or bias against the flexure tongue. The use of the offsets within the spring arms of the flexure can increase the height of the load point dimple necessary to maintain this prestress. The height of a load point dimple thus must be sufficient to provide the prestress and to facilitate slider pitch and roll.

SUMMARY OF THE INVENTION

The present invention is directed to a head suspension having a two piece construction including a load beam and a separately formed flexure wherein the assembly and construction facilitates the need for less space between disks within a disk drive. By the present invention, a lower side profile construction of a two piece head suspension can be made. Accordingly, less spacing between rigid disks is needed, thereby permitting closer disk spacing and increased storage capacity for hard disk drives.

By the present invention, the load point dimple need only have a height to facilitate pitch and roll slider movements; thus, reducing the side profile of the head suspension. The load point dimple height does not have to be larger to provide a prestress or bias of the flexure tongue against the loading portion of the load beam, since the construction in accordance with the present invention independently provides the necessary prestress. Moreover, the present invention allows for the use of load point dimples which are formed within the thickness of the load beam material, which can further reduce the side profile of the head suspension.

The aforementioned advantages of the present invention can be achieved by a head suspension for supporting a head slider over a disk surface within a rigid disk drive having a load beam and a flexure, the load beam having an actuator mounting region and a rigid region distal from the actuator mounting region and having a load portion including an engagement side provided on a first side of the load beam. The flexure being of the type that is constructed as a separate element from the load beam and includes a mounting portion that is connected with the load beam and supports a slider bond pad having a slider mounting surface and an engagement surface. In accordance with one aspect of the present invention, a mounting surface of the mounting portion is provided on an opposite side of the load beam than the first side of the load beam while the engagement surface of the slider bond pad faces the engagement side of the load portion. Preferably, the load portion comprises an extension of the rigid region having a width less than the width of the rigid region, and the flexure further comprises a pair of spring arms that connect the mounting portion of the flexure to the slider mounting pad. In this manner, the spring arms can be positioned laterally outside of the load portion extension. The result is that each spring arm has a first surface that is an extension of the mounting surface and a second surface that is an extension of the engagement surface. A load point dimple can be provided to extend from either the engagement side of the load portion or from the engagement surface of the slider bond pad. The load point dimple can be deformed from the material of the load portion. Alternately, the load portion can be provided with a reduced thickness area as compared to the thickness of the rigid region of the load beam with a load point dimple that extends from the first side of the load beam but within the reduced thickness area. The load point dimple can also be formed integrally with and of the same material as the load portion.

In accordance with another aspect of the present invention, a head suspension comprises a load beam having an actuator mounting region and a rigid region distal from the actuator mounting region, the rigid region having a load portion including a reduced thickness area as compared to the thickness of the rigid region, the reduced thickness area defining an engagement side of the load portion that is on a first side of the load beam, combined with a flexure of the type constructed as a separate element having a mounting portion connected with the load beam and which supports a slider bond pad having a slider mounting surface and an engagement surface facing the engagement side of the load portion. The mounting surface of the mounting portion can be provided on an opposite side of the load beam than the first side of the load beam, as above. Alternatively, the mounting surface of the mounting portion can be connected to the first side of the load beam with its spring arms positioned laterally outside of the load portion extension and each spring arm including an offset bend for providing a first surface portion of each spring arm that is spaced closer in the thickness direction of the load beam to a level of a surface of the reduced thickness area.

DETAILED DESCRIPTION OF THE PREFERRED EMBODIMENTS

Figure 1:
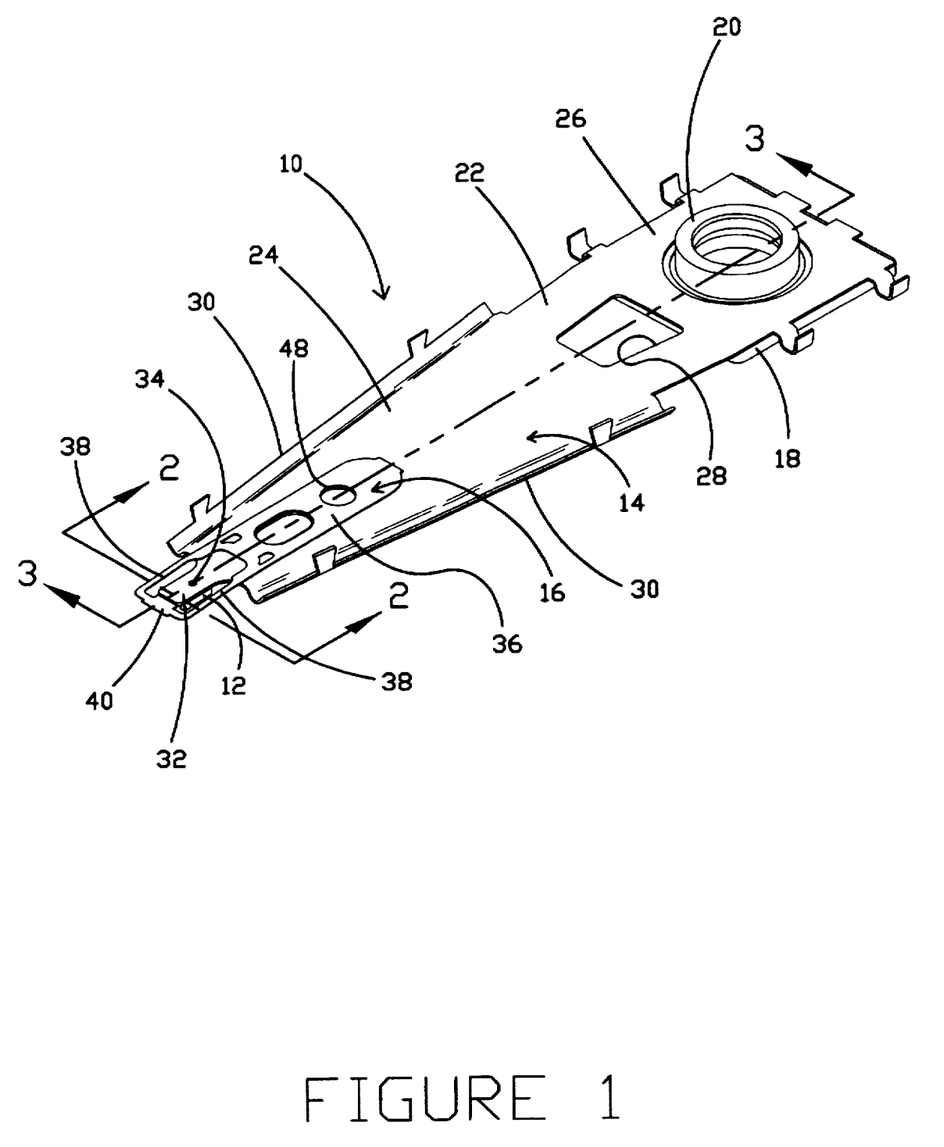
FIG. 1 is an isometric view of a low profile head suspension in accordance with the present invention having an interleaved flexure.
Figure 2:
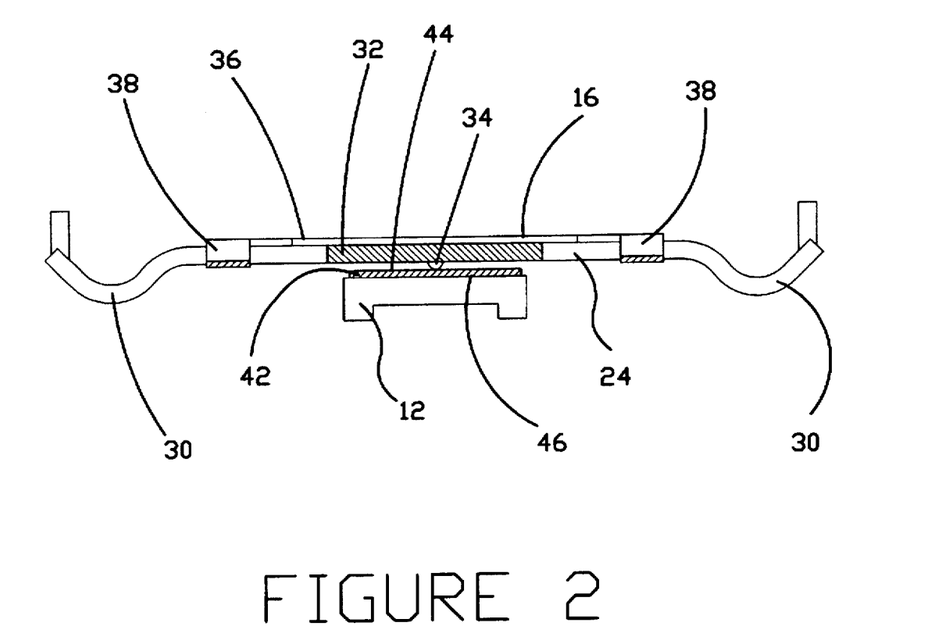
FIG. 2 is a cross section taken along line 2—2 of FIG. 1 showing the relationship of a formed load point dimple to the slider bond pad.

With reference now to the drawings, wherein like components are labeled with like numerals throughout several Figures, and initially to FIGS. 1 and 2, a head suspension 10 is illustrated which is designed for use within a rigid disk drive assembly or similar dynamic storage device. Head suspension 10, in accordance with the present invention, supports a slider 12 at a flying height above a rigid disk surface during operation, as described above in the Background section. Slider 12 also conventionally includes a read/write head. The head suspension 10 is designed to be conventionally attached with an actuator assembly, which can be linear or rotary, as well known. The head suspension 10 and the slider 12 together comprise a suspension assembly.

As shown in FIG. 1, the head suspension 10 basically comprises a load beam 14, a separately formed flexure 16 and a base plate 18 having a collar 20. The load beam 14 further comprises a spring region 22, a rigid region 24 and an actuator mounting region 26. The spring region 22 typically includes a bend or radius to provide a load at the distal tip of the load beam to counteract the aerodynamic lift force acting on the slider during usage and to define the flying height. Illustrated also is a through hole 28 within the spring region 22 for controlling spring rate in a known manner. The rigid region 24 is provided with stiffening rails 30 as are well known to enhance stiffness properties. The base plate 18 is fixed with the actuator mounting region 26 of the load beam, for example by welding. The collar 20 provides a conventional means for attaching the head suspension 10 to an actuator assembly (not shown).

At the distal end of the load beam 14, that is away from the actuator mounting region 26, a reduced width load portion 32 is extended from the rigid region 24 of the load beam 14. The load portion 32 includes an engagement side, from which, as shown best in FIG. 2, extends a load point dimple 34 that is formed within the load portion of 32 for providing a load point to the slider 12 and permit pitch and roll movements. The load point dimple 34 of FIGS. 1 and 2 is a formed dimple provided within the load portion 32, such as for example by a punch which deforms the dimple 34 into the load portion 32. Such a load point dimple 34 can be provided in many different ways for the purpose described below. The flexure 16 is formed as a separate component and is connected with the load beam 14, preferably at its rigid region 24. Flexure 16 comprises a mounting portion 36, which in accordance with the embodiment of FIG. 1, is connected with a first surface (the upper surface of FIGS. 1 and 2) within the rigid region 24. The mounting portion 36 can be connected to the surface of the rigid region 24 by conventional means, usually by welding. The flexure 16 also includes a pair of spring arms 38 which extend from the mounting portion 36 distally from the actuator mounting region 26 of the load beam 14 when assembled together. The distal ends of the spring arms 38 are connected together by a cross piece 40. Extending from the cross piece 40 back toward the actuator mounting region 26, a slider bond pad 42 is provided. The slider bond pad 42 comprises a cantilevered portion supported by the cross piece 40 and has a free end at its proximal edge.

As seen in FIG. 1, the slider bond pad 42 is interleaved with respect to the load portion 32 of the load beam 14. That is, the slider bond pad 42 lies underneath the load portion 32 which is an extension of the rigid region 24 while the mounting portion 36 of the flexure is connected to the upper surface of the rigid region 24. More specifically, an engagement surface 44 of the slider bond pad 42 abuts against the load point dimple 34 that extends from the engagement side of the load portion 32, seen best in FIG. 2. The opposite surface of the slider bond pad 42 provides a slider mounting surface 46 onto which the slider 12 is conventionally mounted, such as by adhesive. An alignment opening 48 is also provided within the mounting portion 36 of the flexure 16 for alignment purposes with a similar hole provided through the rigid region 24 of the load beam 14.

By this construction, shown best in FIG. 2, the slider bond pad 42 is adequately urged against the load point dimple 34 by way of the spring arms 38. Sufficient flexure of the spring arms 38 is provided merely by the thickness of the load beam 14 within its rigid region 24 and the height of load point dimple 34. It is an important point of the present invention that the load point dimple 34 need not be provided with extra height in order to provide the prestress or biasing function of the engagement surface 44 of the slider bond pad 42 toward the engagement side of the load portion 32. This function is accomplished by providing the mounting portion 36 of the flexure 16 on the opposite side of the rigid region 24 of the load beam 14 rather than the side of the load portion 32 from which the load point dimple 34 extends. The thickness of the load beam, thus, provides the prestress.

Moreover, by interleaving the flexure 16 with respect to the load portion 32, the thickness of the material of flexure 16 need not be accommodated within the height of load point dimple 34. The thickness of the flexure 16 is instead shifted to the other side of the load beam 14 where it does not affect the height of load point dimple 34. The result is a load point dimple 34 that needs to be provided with a height sufficient only to facilitate pitch and roll slider movements. That height is dependent upon the dimensions of the slider 12 and the degree of pitch and roll movements which must be accommodated for satisfactory performance.

Alternatively, the load point dimple 34 can be provided extending from the engagement surface 44 of the slider bond pad 42 of the flexure 16. In this case, the surface of the engagement side of the load portion 32 contacts the load point dimple. Such a load point dimple similarly only requires a height necessary to facilitate pitch and roll movements, and the construction similarly provides the prestress or bias.

It is also important to note that even though the thickness of the flexure 16 is still a component in the total thickness of the head suspension 10 at the tip region thereof, its effect for all practical purposes is eliminated. This is because the mounting portion 36 of the flexure 16, when provided on the opposite surface of the load beam 14 from the side from which the load point dimple 34 extends, lies within spacing that is otherwise provided. In other words, the mounting portion 36 lies within space created by rails 30 and, with reference to FIG. 3, the offset height X of the head suspension 10 when in its loaded state. As described above in the Background section of this application, a head suspension 10 is provided to support the head and slider 12 at a specific flying height. A measurement of the distance between the level of the actuator mounting region 26 and the level of the slider bond pad 42, when in this loaded state, is the offset height X. Again, offset heights typically range from 0.1 mm to 0.7 mm. Thus, by this construction, the load point dimple 34 can be provided with less height while the thickness of flexure 16 is in practical effect inconsequential. Therefore, the spacing required between a pair of rigid disks when provided in a disk drive stack is reduced to facilitate closer disk spacings. That is, the head suspension 10 has a lower profile in the sense of space requirements.

Figure 4:
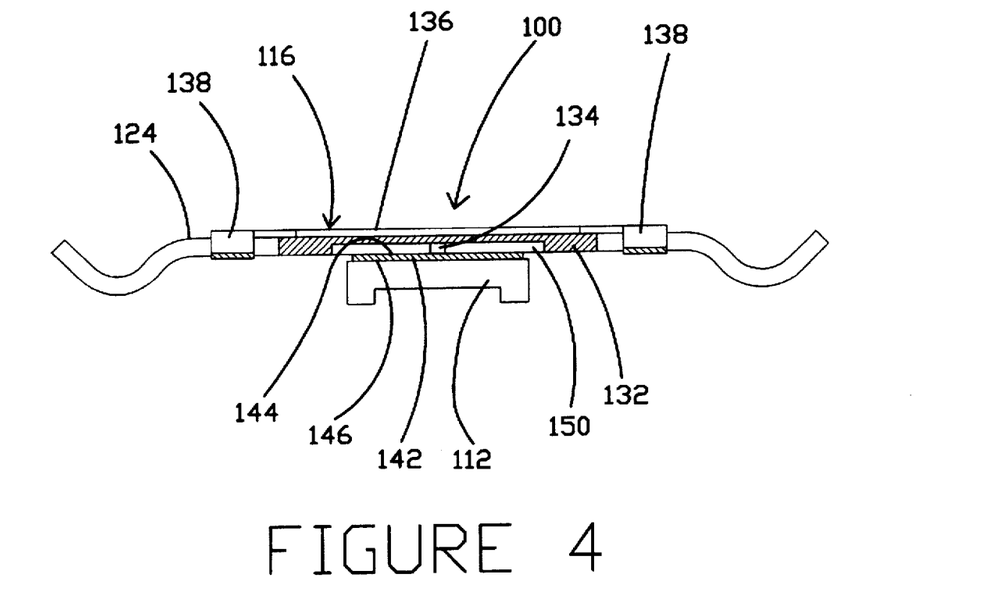
FIG. 4 is a cross sectional view similar to FIG. 2 but illustrating a load point dimple formed of the material of the load beam and within the thickness of the load beam and with an interleaved flexure.
Figure 5:
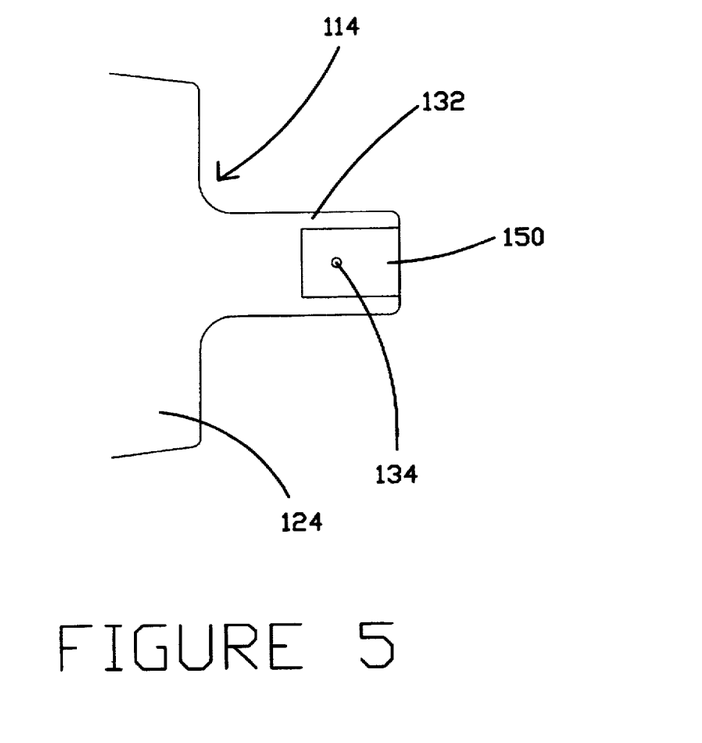
FIG. 5 is a partial bottom view of the end of the load beam of the head suspension of FIG. 4 showing its load portion and load point dimple.

Another embodiment of a head suspension 100 in accordance with the present invention is illustrated in FIG. 4, which is a similar cross sectional view as that of FIG. 2. The head suspension 100 is similar to the head suspension 10 described above except in the area of the load portion 132 that extends from a rigid region 124 of a load beam 114, as shown in FIG. 5.

A flexure 116 includes a mounting portion 136 that is conventionally connected to a first surface of the rigid region 124 (the upper surface as shown in FIG. 4). Spring arms 138 extend distally from the mounting portion 136 of the flexure 116 to support a slider bond pad 142 by a cross piece in the same manner as shown in FIG. 1. An engagement surface 144 of the slider bond pad 142 is urged against a load point dimple 134 by the spring arms 138. The load point dimple 134, as illustrated, extends from the engagement side of the load portion 132 that extends from the load beam 114. The load point dimple may alternatively extend from the engagement surface 144 of the slider bond pad 142 to contact the surface of the engagement side of the load portion 132. The slider 112 is conventionally fixed to the slider mounting surface 146 of the slider bond pad 142.

This embodiment is different from the above in that the load point dimple 134 is provided within the thickness of the load portion 132 of load beam 114. A preferred manner of doing this is by providing a reduced thickness area 150 from the surface of the engagement side of load portion 132 that is opposite to the surface of the rigid region 124 to which the mounting portion 136 of flexure 116 is attached. Moreover, it is preferable that the load point dimple 134 is formed extending from the reduced thickness area 150 and from the material of the load portion 132. The load point dimple 134 can be made by removing material to provide the reduced thickness area 150 except for in the area where the load point dimple 134 is to be formed. A preferable method of providing the reduced thickness area 150 while leaving the load point dimple 134 is using an etching process. Many conventional etching processes are known in the art for partial etching of head suspension material (usually stainless steel). By controlling the etching process, the reduced thickness area 150 can be provided at any depth within the thickness of load portion 132.

As above, it is desirable that the load point dimple 134 have a height sufficient to permit pitch and roll movements of the slider 112 during usage. Again, the load point dimple 134 need only be of a height sufficient to facilitate the pitch and roll movement. By virtue of the construction, the flexure thickness is practically eliminated as a factor in determining side profile height, and the prestress or bias is still adequately provided. Moreover, the load point dimple 134 need not be of a height coplanar with the lower surface (as viewed in FIG. 4) of the load portion 132. That is, the dimple 134 may end within the thickness of the load portion 132. However, it is preferable that the reduced thickness area 150 only be reduced by an amount sufficient to define the adequate height of the load point dimple 134. Alternatively, even with the provision of the reduced thickness area 150, the load point dimple may be a formed dimple or may be built up in any way. With a formed or built-up dimple, the dimple may extend beyond the plane of the lower surface of the load portion 132, if desired; but this is less preferable in that the extension of the dimple beyond the surface adds to the spacing requirements. In the case where the load point dimple is provided to extend from the engagement surface 144 of the flexure 116, the reduced thickness area 150 may be made flat to define a contact surface on the engagement side of the load portion 132.

Also according to this embodiment, the reduced thickness area 150 need not extend across the entire width of the surface of the engagement side of the load portion 132, as is shown in FIG. 5. The reduced thickness area 150 extends to the distal edge of the load portion 132 to accommodate the slider bond pad 142. However, the width of the reduced thickness area 150 need only be wide enough to facilitate the width of the slider bond pad 142 or the width of slider 112, whichever is greater. By using such a partial etching technique, the load point dimple 134 can be very precisely located within the reduced thickness area 150 to provide the point load to the engagement surface 144 of the slider bond pad 142.

Figure 3:
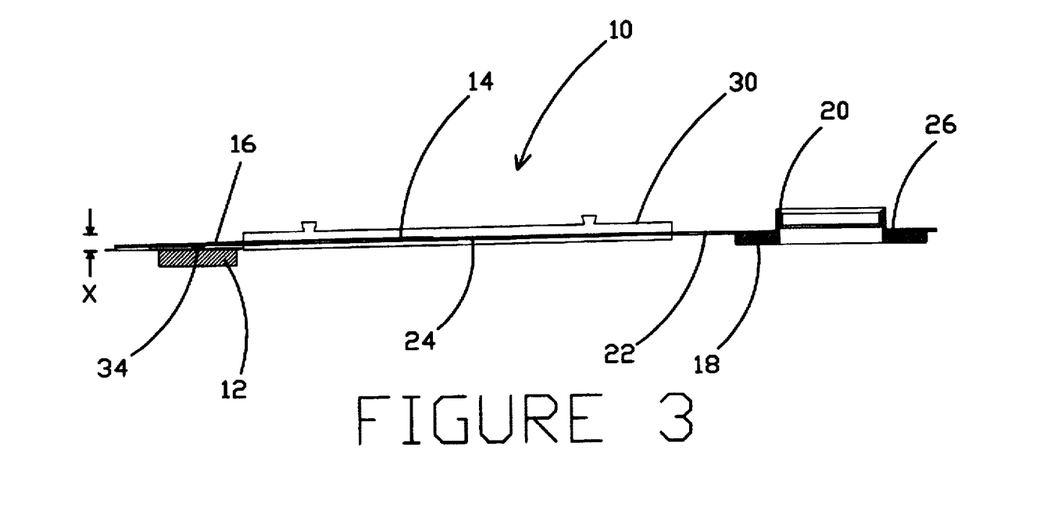
FIG. 3 is a longitudinal cross section of the head suspension of FIG. 1 taken along line 3—3 with the head suspension illustrated in a loaded state at flying height.

In addition to reducing thickness in the same manner as the FIGS. 1–3 embodiment, the FIGS. 4–5 embodiment provides for an even lower profile. The further reduction in profile results from the provision of the load point dimple 134 within the thickness of the load portion 132. By this construction, an adequate flex is still provided within the spring arms 138 to prestress or bias the upper surface 144 of the slider bond pad 42 against the load point dimple 134. The partial thickness of the load portion 132 provides the adequate flex.

Figure 6:
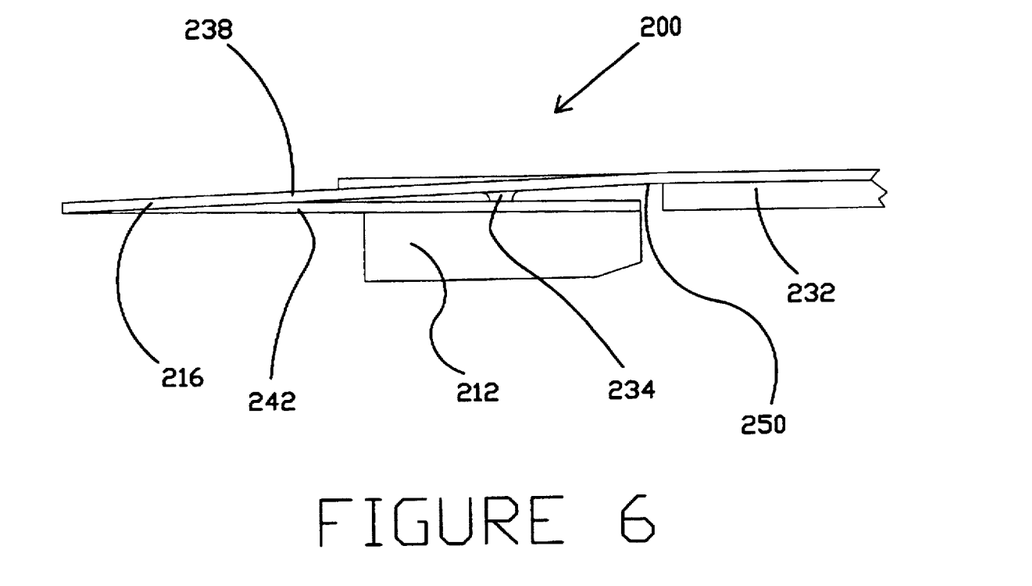
FIG. 6 is a partial side view of yet another head suspension including a load point dimple formed within the thickness of the load beam and from the load beam material but where the partial thickness extends to the edge of the load portion of the load beam.

In FIG. 6, another embodiment of a head suspension 200 is partially illustrated which is similar to FIGS. 4–5 embodiment. Illustrated is only the portion of flexure 216 and the load portion 232 which are distal from the rigid region of the load beam. The only difference from the FIGS. 4–5 embodiment is that a reduced thickness area 250, which is provided on the engagement side of the load portion 232, extends entirely across the width of the load portion 232. The load point dimple 234 is preferably provided in the same manner, but may also be provided extending from an engagement surface of the slider bond pad 242. Spring arms 238 urge the engagement surface of the slider bond pad 242 against the load point dimple 234. The prestress being provided by the partial thickness of the load portion 232. As above, the height of the load point dimple 234 need only be based on the ability to facilitate pitch and roll movements of slider 212, which can be conventionally mounted to the slider bond pad 242.

Figure 7:
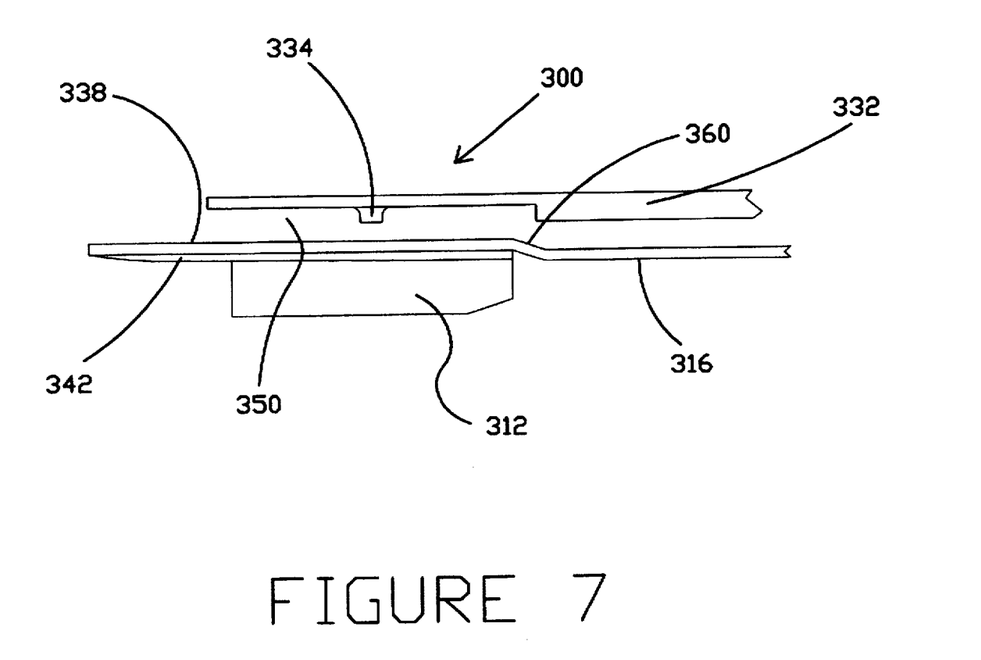
FIG. 7 is a partially exploded side view of a portion of yet another embodiment of a low profile head suspension in accordance with the present invention utilizing a load point dimple formed of the material of the load beam and within the thickness of the load beam and having a flexure mounted to the dimple side of the load beam.
Figure 8:
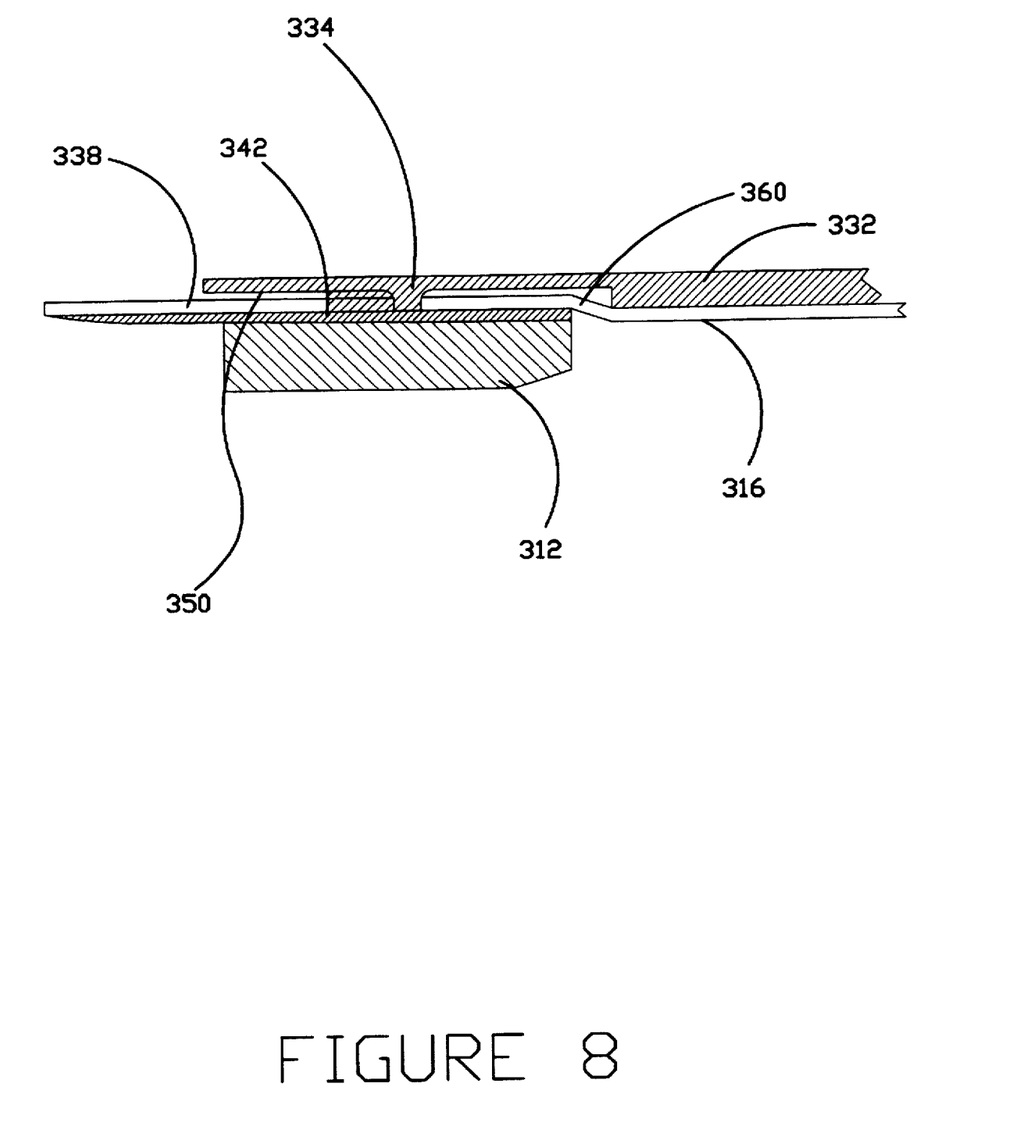
FIG. 8 is a partial side view of the head suspension of FIG. 7 in assembled state and in longitudinal cross-section.

Yet another embodiment is illustrated in FIGS. 7 and 8 of a low profile head suspension 300. Like FIG. 6, only that portion of the flexure 316 and the load portion 332 distal from the rigid region of the load beam are illustrated. This construction provides a load point dimple 334 extending from an engagement side of the load portion 332 within a reduced thickness area 350. Preferably, the load point dimple 334 lies within the thickness of the load portion 332. Like the above designs, the load point dimple 334 is more preferably formed of the same material as the load portion 332.

However, the construction of FIG. 7 is not an interleaved design. But, like each of the embodiments described above, the load point dimple 334 only needs to have a height merely based upon the ability to permit pitch and roll movements of slider 312. Specifically, the flexure 316 includes a pair of spring arms 338 that support slider bond pad 342 by a cross-piece. Slider 312 is conventionally secured to the mounting surface of the slider bond pad 342. As shown assembled together in FIG. 8, an engagement surface of slider bond pad 342 is urged against the load point dimple 334 by the spring arms 338. In order to provide the prestress or biasing of the engagement surface of the slider bond pad 342 against the load point dimple 334, the spring arms 338 are provided with offset bends 360. Preferably, such an offset bend is provided in each of the spring arms 338 at or near the location of the step down to the reduced thickness area 350 in the longitudinal direction of the load portion 332.

By this construction, the flexure 316 can be mounted to the rigid region of the load beam on the same side of the rigid region as the engagement side of the load portion 332, from which the load point dimple 334 preferably extends. As above, the load point dimple may instead extend from the engagement surface of the slider bond pad 342 to contact with the surface of the reduced thickness area 350, which may be made substantially flat. In any case, the offset portions 360 provide the prestress or biasing of the slider bond pad 342 against the load point dimple 334 even where the load point dimple 334 is formed within the thickness of the load portion 332.

I claim:

1. A head suspension for supporting a head slider over a disk surface within a rigid disk drive comprising:
   a load beam having a first side and comprising an actuator mounting region and a rigid region distal from said actuator mounting region, said rigid region having a load portion including an engagement side that is on said first side of said load beam;
   a flexure constructed as a separate element from said load beam and connected with said load beam, said flexure comprising a mounting portion connected with said load beam and which supports a slider bond pad having a slider mounting surface and an engagement surface, wherein a mounting surface of said mounting portion is provided on and overlies at least a portion of an opposite side of said load beam than said first side of said load beam, and said engagement surface of said slider bond pad faces said engagement side of said load portion.

2. The head suspension of claim 1, further including a load point dimple provided to extend from one of said engagement side of said load portion and said engagement surface of said slider bond pad for contacting the other.

3. The head suspension of claim 2, wherein said mounting portion of said flexure is connected to said rigid region of said load beam.

4. The head suspension of claim 3, wherein said load portion comprises an extension of said rigid region having a width less than the width of said rigid region.

5. The head suspension of claim 4, wherein said flexure further comprises a pair of spring arms connecting said mounting portion of said flexure to said slider mounting pad, said spring arms positioned laterally outside of said load portion extension and each spring arm having a first surface that is an extension of said mounting surface and a second surface that is an extension of said engagement surface of said slider bond pad.

6. The head suspension of claim 2, wherein said load point dimple comprises an extension from said first side of said load beam that is deformed from the material of said load portion.

7. The head suspension of claim 2, wherein said load portion includes a reduced thickness area as compared to the thickness of said rigid region of said load beam, and said load point dimple extends from the first side of said load beam but within said reduced thickness area.

8. The head suspension of claim 7, wherein said load point dimple is formed integrally with and of the same material as said load portion.

9. The head suspension of claim 8, wherein said load point dimple extends from said reduced thickness area to substantially the same level as a thickness of said rigid region of said load beam.

10. The head suspension of claim 7, wherein said reduced thickness area extends only partially across a transverse width of said load portion leaving full thickness areas to both transverse sides of said reduced thickness area.

11. The head suspension of claim 10, wherein said slider bond pad has a transverse width that is less than the transverse width of said reduced thickness area.

12. A head suspension for supporting a head slider over a disk surface within a rigid disk drive comprising:
   a load beam having a first side and comprising an actuator mounting region and a rigid region distal from said actuator mounting region, said rigid region having a load portion including a reduced thickness area as compared to the thickness of said rigid region, said reduced thickness area defining an engagement side of said load portion that is on said first side of said load beam;
   a flexure constructed as a separate element from said load beam and connected with said load beam, said flexure comprising a mounting portion connected with said load beam and which supports a slider bond pad having a slider mounting surface and an engagement surface that faces said engagement side of said load portion.

13. The head suspension of claim 12, further including a load point dimple provided to extend from one of said engagement side of said load portion and said engagement surface of said slider bond pad for contacting the other.

14. The head suspension of claim 13, wherein a mounting surface of said mounting portion of said flexure is provided on and overlies at least a portion of an opposite side of said load beam than said first side of said load beam.

15. The head suspension of claim 14, wherein said mounting portion of said flexure is connected to said rigid region of said load beam.

16. The head suspension of claim 15, wherein said load portion comprises an extension of said rigid region having a width less than the width of said rigid region.

17. The head suspension of claim 16, wherein said flexure further comprises a pair of spring arms connecting said mounting portion of said flexure to said slider mounting pad, said spring arms positioned laterally outside of said load portion extension and each spring arm having a first surface that is an extension of said mounting surface and a second surface that is an extension of said engagement surface of said slider bond pad.

18. The head suspension of claim 13, wherein said load point dimple is formed integrally with and of the same material as said load portion.

19. The head suspension of claim 13, wherein said load point dimple extends from said reduced thickness area to substantially the same level as a thickness of said rigid region of said load beam.

20. The head suspension of claim 13, wherein said reduced thickness area extends only partially across a transverse width of said load portion leaving full thickness areas to both transverse sides of said reduced thickness area.

21. The head suspension of claim 20, wherein said slider bond pad has a transverse width that is less than the transverse width of said reduced thickness area.

22. The head suspension of claim 12, wherein a mounting surface of said mounting portion of said flexure is provided on and overlies at least a portion of said first side of said load beam.

23. The head suspension of claim 22, wherein said mounting portion of said flexure is connected to said rigid region of said load beam.

24. The head suspension of claim 23, wherein said load portion comprises an extension of said rigid region having a width less than the width of said rigid region.

25. The head suspension of claim 24, wherein said flexure further comprises a pair of spring arms connecting said mounting portion of said flexure to said slider mounting pad, said spring arms positioned laterally outside of said load portion extension and each spring arm including an offset bend for providing a first surface portion of each spring arm that is spaced closer in the thickness direction of said load beam to a level of a surface of said reduced thickness area than the remainder of said spring arm.

\* \* \* \* \*